United States Patent Office 3,825,654
Patented July 23, 1974

3,825,654
PROCESS FOR REDUCING THE CONTENT OF NITROGEN OXIDES IN THE EXHAUST GASES FROM INTERNAL COMBUSTION ENGINES
Tadeusz P. Kobylinski, Cheswick, and Brian W. Taylor, Richland Township, Allegheny County, Pa., assignors to Gulf Research & Development Company, Pittsburgh, Pa.
No Drawing. Filed Apr. 21, 1972, Ser. No. 246,170
Int. Cl. B01d 53/34
U.S. Cl. 423—213.7                    20 Claims

ABSTRACT OF THE DISCLOSURE

A method is proposed for the reduction of nitrogen oxides in exhaust gases from internal combustion engines to form nitrogen as substantially the only nitrogen-containing compound. The method comprises contacting an exhaust gas from an internal combustion engine at an elevated temperature in a first zone in a reducing atmosphere with a catalyst, such as platinum, that will convert the nitrogen oxides to a product comprising ammonia and thereafter contacting the resultant gaseous mixture at an elevated temperature in a second zone in a reducing atmosphere with ruthenium or rhodium to convert the ammonia to nitrogen.

---

This invention relates to the selective removal of nitrogen oxides in the exhaust gases from internal combustion engines. In particular, this invention relates to the selective conversion of nitrogen oxides in the exhaust gases from internal combustion engines to nitrogen.

Considerable research effort has been expended over the past several years to discover means for the removal of nitrogen oxides in the exhaust gases from internal combustion engines. Nitrogen oxides constitute an undesirable air pollutant, but the removal of these nitrogen oxides, i.e., NO and $NO_2$, has proven to be a much more difficult problem than first anticipated. These problems and some of the solutions tried are described in the paper "$NO_x$ Reduction Catalysts for Vehicle Emission Control" by G. H. Meguerian and C. R. Lange, published by the Society of Automotive Engineers, Inc. and presented as a part of the Automotive Engineering Congress Meeting in Detroit, Mich., on Jan. 11–15, 1971. The problem is complicated by the fact that while several catalytic materials are available to convert nitrogen oxides (which are present in low concentrations in the exhaust gases from internal combustion engines) very rapidly to acceptable inert materials, such as nitrogen, most of these catalysts are active only when pure reducing agents, such as carbon monoxide, are used in an anhydrous environment. Examples of these types of materials are the transition metal oxides, which are easily poisoned by trace amounts of water. It is obvious that these catalytic materials are unacceptable for use in an automobile exhaust converter, since the automobile exhaust gases can contain up to 16 percent water.

Noble metals, such as platinum and palladium, retain their activity for the reduction of nitrogen oxides in the presence of water; however, hydrogen as a reducing agent using platinum or palladium as the reduction catalyst proved totally unacceptable, since hydrogen was found to react with the nitrogen oxides to produce substantial amounts of unwanted ammonia. The use of carbon monoxide as a reducing agent was also found undesirable, since it reacted with water over the platinum or palladium catalyst by the well-known water gas shift reaction to give hydrogen and $CO_2$. The hydrogen would then, in turn, react preferentially with the nitrogen oxides to give ammonia. Ammonia is not only a pollutant per se, but, additionally, the ammonia, if present, would be reoxidized back to the undesirable nitrogen oxides in a second-stage reaction chamber, which would be normally employed to oxidize any unburned hydrocarbons or carbon monoxide in the exhaust gases to form $CO_2$ and water. As a consequence, the desired amount of nitrogen oxide removal could not be achieved. It was, of course, not possible to add the oxidizing gas to the first stage, since the platinum and palladium catalysts do not function to reduce NO in the presence of a predominating oxidizing atmosphere.

We have found that substantially all of the nitrogen oxides in exhaust gases from internal combustion engines can be converted to nitrogen by a process which involves contacting said exhaust gases in a first stage with a catalyst which will convert the nitrogen oxides therein to a product containing ammonia and then contacting the resulting gaseous mixture in a second stage with a selected amount of ruthenium or rhodium. By "substantially all of the nitrogen oxides" we means that at least about 75 mol percent of the nitrogen oxides are converted herein, preferably at least about 85 mol percent are converted, but most preferably at least about 90 mol percent are converted.

The gas mixtures of interest for treatment in accordance with the process of this invention are those gas mixtures produced by the combustion of a hydrocarbon fuel using air, such as the exhaust gases from an internal combustion engine utilizing a hydrocarbon-type fuel. By "an internal combustion engine" we mean to include an engine having a combustion chamber wherein a hydrocarbon fuel is burned with molecular oxygen and the products of combustion are used to drive moving parts, such as a piston, rotors, etc. These hydrocarbon fuel exhaust gases contain small concentrations of NO and $NO_2$ where usually the mol ratio of NO to $NO_2$ exceeds 1:1.

An automobile exhaust gas that can be treated in accordance with the process defined and claimed herein would have a composition whose major components would be as shown in Table I below:

TABLE I

| | Components | Broad range, mol percent | Usual range, mol percent |
|---|---|---|---|
| 1 | $NO_x$, where $x$ is 1 or 2 | 50 to 5,000 p.p.m.[2] | 100 to 3,500 p.p.m. |
| 2 | Free molecular oxygen | 0 to 5 | 0.5 to 2. |
| 3 | Free molecular hydrogen | 0.1 to 4 | 0.2 to 1. |
| 4 | CO | 0.2 to 8 | 0.4 to 2. |
| 5 | Hydrocarbons [1] | 0 to 4,000 p.p.m.[2] | 50 to 1,000 p.p.m.[2] |
| 6 | $H_2O$ | 5 to 16 | 10 to 13. |
| 7 | $CO_2$ | do | 10 to 13. |
| 8 | Lead (as metal) | 0 to 12 p.p.m.[2] | 0 to 4 p.p.m[3] |
| 9 | Nitrogen | 53 to 89 | 68 to 78. |

[1] Calculated as carbon.
[2] By volume.

Any catalyst that can, under a reducing atmosphere and at elevated temperatures, convert the nitrogen oxides to a product comprising ammonia can be used in the first stage herein. Under such reducing atmosphere the remainder of the nitrogen oxides not converted to ammonia are converted to nitrogen. In general from about 15 to about 100 mol percent, preferably from about 20 to about 80 mol percent, of the nitrogen oxides will be converted to ammonia. As examples of catalysts that can be used in the first stage mention can be made of platinum, palladium, copper or its oxides, copper-chromia, nickel or its oxides, etc.

The exhaust gas from the first stage is then brought into contact, under a reducing atmosphere and at elevated temperatures, with ruthenium or rhodium. Under such conditions substantially all of the ammonia that was formed in the first stage is converted to nitrogen and hydrogen. In general, from about 50 to about 100 mol percent, preferably from about 75 to about 95 mol percent, of the ammonia is so converted. By "reducing atmosphere" we mean an atmosphere wherein the stoichiometric ratio of molecular oxygen to the reducing agents in the reaction zones is less than 1:1, preferably about 0.9:1 or less. As a result of the operation from about 75 to about 100 mol percent, preferably from about 85 to about 100 mol percent of the nitrogen oxides in the exhaust gas will have been converted to nitrogen.

The catalyst for use in the two stages defined above can be unsupported and in substantially pure form, but in a preferred embodiment the same are suitably distended on a support. The amount of catalyst on the support can suitably be, for example, from about 0.01 to about 10 weight percent of the support, but is usually and preferably from about 0.05 to about 1.0 weight percent of the support.

The support for the catalysts to be used in the process of this invention can be any of the refractory oxide supports well-known in the art, such as those prepared from alumina, silica, magnesia, thoria, titania, zirconia, silica-aluminas, silica-zirconas, magnesia-alumnas, etc. In addition, the support can be an activated carbon, pumice, etc. Other suitable supports include the naturally occurring clays, such as diatomaceous earth. In general, the surface area of these supports can be from about 10 m.$^2$ to about 500 m.$^2$ per gram, preferably from about 50 m.$^2$ to about 300 m.$^2$ per gram. Additional desirable supports for use herein are the more recently developed corrugated ceramic materials made, for example, from alumina, silica and magnesia, lithium, etc. An example of such ceramic material is Therma Comb made by American Lava Corporation, Chattanooga, Tenn., which is more fully described in U.S. Pat. No. 3,444,925. If desired, the catalyst can be mounted directly onto the surface of the ceramic material, the ceramic material can first be coated with a refractory oxide, such as defined above, prior to the deposition of the catalyst thereon or the catalyst can be combined with the refractory oxide and the resultant combination can then be deposited on the ceramic material. The ceramic materials per se have a low surface area and high heat stability, and the addition of the refractory oxide coating increases the surface area to a more desirable range. In addition, these coated ceramics possess the further advantage of being easily formed in one piece. Very little, if any, pressure drop is experienced by the passage of exhaust gases through such ceramic materials.

Any suitable method well-known to those having ordinary skill in the art can be employed in the preparation of the supported catalysts used herein. For example, platinum for use in the first stage and ruthenium or rhodium for use in the second stage can be deposited on a support by contacting the support with an aqueous solution of chloroplatinic acid, ruthenium chloride or rhodium chloride, respectively, at room temperature and room pressure for a suitable period of time, for example, about six hours. The catalyst can then be dried and calcined in the usual manner, for example, dried for six hours at 200° F. and then calcined for 12 hours at a temperature of about 700° to about 1000° F., after which it is ready for use in the process defined herein. Some of the metal on these supports can be present as a chemical compound, for example, as platinum, ruthenium or rhodium oxide, or some can be chemically and/or physically bonded to the surface of the support, for example, with an alumina base a chemical bond may exist between the surface oxide ions and the platinum, ruthenium or rhodium, but, in general, it is believed most of the platinum, ruthenium or rhodium are present in their elemental form.

In carrying out the process defined and claimed herein it is imperative that effective amounts of catalyst be in each of the two reaction zones defined above, that is, from about 0.5 to about 0.0001, preferably from about 0.3 to about 0.0001, Troy ounce of catalyst per 1000 cubic feet of exhaust gas per hour. By "Troy ounce" we mean 31.1 grams of catalyst. In general, during idling an internal combustion engine, particularly of the automotive type, can produce as low as about 600 cubic feet per hour of exhaust gas and at extremely high speeds, for example, at speeds in excess of about 60 miles per hour, can produce as high as about 12,000 cubic feet per hour of exhaust gas, but in general from about 1500 to about 8000 cubic feet per hour of exhaust gas will be produced at speeds below about 60 miles per hour. The catalysts used in each of the two reaction zones are effective at both low and high gas hourly space velocities (GHSV), i.e., at 8,000 to about 200,000, or even higher, volumes of gas per hour per volume of catalyst. In general, we prefer to operate at space velocities of about 10,000 to about 90,000. Here, as elsewhere in this specification, volumes are defined as being at standard conditions, that is, 760 mm. Hg and 0° C.

The reaction pressure in each of the two stages is not critical and suitable pressures are from about 0 to about 150 pounds per square inch gauge, with the preferred pressure being atmospheric or slightly above. In the first stage the temperature is from about 600° to about 2000° F., preferably within the range of about 800° to about 1500° F., whereas in the second stage the temperature is from about 800° to about 2000° F., preferably in the range of about 900° to about 1400° F., when ruthenium is used, and from about 1000° to about 2000° F., preferably in the range of about 1100° to about 1500° F., when rhodium is used.

It is also important with automotive exhaust gases to not only remove nitrogen oxides but also to remove unburned hydrocarbons and carbon monoxide. The removal of the unburned hydrocarbon and carbon monoxide can easily be achieved by an oxidation reaction using known catalysts under known oxidizing conditions. This oxidation must occur, however, in the substantial absence of ammonia, since ammonia will quickly reoxidize to form undesirable nitrogen oxides. By the use of the combination of catalysts, utilizing the conditions as set forth herein, to obtain a product having substantially no ammonia, the product gases can then be oxidized in a third-stage converter utilizing oxidation catalysts, which are well known in the art, under oxidation conditions to oxidize any unburned hydrocarbons and carbon monoxide to non-polluting gases such as carbon dioxide and water. Usually combustion air is pressurized into the $NO_x$-free gases at a flow rate such that the average temperature of the catalyst bed is maintained at a level from about 800° to about 1700° F., preferably a temperature of 900° to 1100° F. Any of the metals of Group VIII, for example, platinum, palladium, rhodium, etc. can successfully be employed in the oxidation of unburned hydrocarbons and CO to produce $CO_2$ and water in the presence of a combustion gas such as air. In addition, copper, vanadium or chromium-containing catalysts can also be used. The metals are usually distended on a support which can be the same as the supports described above for use with the ruthenium catalysts. Other typical oxidation catalysts, conditions and operational procedure can be the same as described in U.S. Pat. No. 3,503,715 to Haensel and the teachings of this patent are incorporated herein by reference. Still another procedure for the oxidation of unburned hydrocarbons and CO with molecular oxygen in the presence of oxidation catalysts, including ruthenium, is claimed in U.S. Pat. No. 3,257,163 to Stiles.

The invention will be further described by reference to the following experimental work.

Experiments were conducted wherein selected feeds were passed over a gamma alumina base carrying one percent by weight of ruthenium, rhodium, iridium, osmium, platinum or palladium at selected temperature levels, atmospheric pressure and a gas hourly space velocity (GHSV) of 20,000, that is, twenty thousand volumes of gas per volume of catalyst per hour. At this space velocity 0.2 Troy ounce of each of these metals was persent per 1000 cubic feet of gas being treated per hour. The amount of metal in the examples herein, in Troy ounces per 1000 cubic feet of exhaust gas per hour, was determined in accordance with the following equation:

$$\frac{\text{Weight percent metal on support} \times 1000}{\text{GHSV} \times \text{factor}},$$

wherein the factor is determined in accordance with the following equation:

$$\frac{31.1}{\text{Density of catalyst} \times 10 \times 28.31},$$

the number 31.1 being the number of grams in one Troy ounce, 28.31 being the number of liters in one cubic foot of gas, the GHSV is expressed in liters of gas per liter of catalyst per hour, and the density is defined in grams/cc. This simplifies to $$\frac{9,099.7 \times \text{weight percent metal} \times \text{density}}{\text{GHSV}},$$

wherein the weight percent metal is the weight percent metal on the catalyst as the percentage figure and not expressed as a weight fraction. The one-sixteenth diameter alumina spheres used have the following characteristics: 190 m.$^2$/gram surface area; 0.82 cc./gram pore volume, and an average pore diameter of 185 A. The metals were added to the alumina spheres by contacting them with an aqueous solution of ruthenium chloride, rhodium chloride, iridium chloride, chlorosmic acid, chloroplatinic acid or palladium chloride at atmospheric temperature and atmospheric pressure. The catalysts were dried at a temperature of 250° F. for six hours and then calcined in air at 900° F. for six hours. The gaseous mixtures treated can be identified as follows: Feed I contained 0.5 mol percent of anhydrous ammonia and 99.5 mol percent of argon; Feed II 0.5 mol percent of anhydrous ammonia, 1.5 mol percent of hydrogen and 98.0 mol percent of argon; Feed III 0.5 mol percent of anhydrous ammonia, 1.5 mol percent of hydrogen, 1.5 mol percent of carbon monoxide and 96.5 mol percent of argon; and Feed IV 0.5 mol percent of anhydrous ammonia, 1.5 mol percent of hydrogen, 1.5 mol percent of carbon monoxide. 1.5 mol percent of water and 95.0 mol percent of argon. The results obtained are tabulated below in Table II.

TABLE II

| Example number | Metal | Reaction temp., °F. | Mol percent ammonia decomposition in feeds | | | |
|---|---|---|---|---|---|---|
| | | | I | II | III | IV |
| 1 | Ru | 800 | 100 | 100 | 95 | 85 |
| 2 | Ru | 1,000 | 100 | 100 | 100 | 100 |
| 3 | Ru | 1,200 | 100 | 100 | 100 | 100 |
| 4 | Rh | 800 | 100 | 80 | 55 | 45 |
| 5 | Rh | 1,000 | 100 | 100 | 80 | 50 |
| 6 | Rh | 1,200 | 100 | 100 | 100 | 100 |
| 7 | Ir | 800 | 30 | 18 | 5 | 0 |
| 8 | Ir | 1,000 | 90 | 70 | 10 | 5 |
| 9 | Ir | 1,200 | 100 | 95 | 20 | 15 |
| 10 | Os | 800 | 96 | 26 | 5 | 0 |
| 11 | Os | 1,000 | 88 | 80 | 18 | 10 |
| 12 | Os | 1,200 | 100 | 100 | 20 | 12 |
| 13 | Pt | 800 | 13 | 2 | 0 | 0 |
| 14 | Pt | 1,000 | 22 | 8 | 1 | 1 |
| 15 | Pt | 1,200 | 59 | 29 | 12 | 7 |
| 16 | Pd | 800 | 1 | 0 | 0 | 0 |
| 17 | Pd | 1,000 | 20 | 12 | 1 | 1 |
| 18 | Pd | 1,200 | 55 | 40 | 20 | 15 |

A study of the experiments summarized in Table II clearly illustrates the uniqueness of ruthenium and rhodium for decomposing ammonia in the exhaust gas from an internal combustion engine. Note that as long as the gaseous mixture contains only ammonia and an inert gas (Feed I) ruthenium, rhodium, iridium and osmium are effective in decomposing ammonia, while platinum and palladium are ineffective. When the gaseous mixture in Feed II additionally contains hydrogen, as in the exhaust gas from an internal combustion, somewhat similar results are obtained, although the effectiveness of iridium and osmium are reduced and relatively high temperatures are required therefor. In Feed III both hydrogen and carbon monoxide, as in the exhaust gas from an internal combustion engine, are present in addition to ammonia. Apparently the ability of iridium, osmium, platinum and palladium to decompose ammonia in the presence of hydrogen and carbon monoxide is severely inhibited and therefore only ruthenium and rhodium proved to be effective. With Feed IV, containing additionally water, also a component in the exhaust gas from an internal combustion engine, ruthenium proved to be an excellent catalyst and similarly rhodium, especially at the higher temperatures.

These results are surprising in light of the teaching of Rosenblatt et al. in U.S. Pat. No. 2,601,221. On the basis of the teaching therein, we concluded that iridium would be the most effective of the noble metals in decomposing ammonia. Our findings show, however, as pointed out above, that if in addition to ammonia, hydrogen, carbon monoxide and water are present, all components of the exhaust gas from an internal combustion engine, they will severely inhibit the effectiveness of iridium for the decomposition of ammonia. While such conclusion is true with osmium, unexpectedly we have found that rhodium and, especially, ruthenium retain their ability to decompose ammonia in such environment.

Another series of experiments was made as above but with a feed simulating a gaseous mixture obtained from an internal combustion engine but containing some ammonia, consisting of 0.3 mol percent anhydrous ammonia, 1.0 mol percent of carbon monoxide, 0.5 mol percent of hydrogen, 0.2 mol percent of propylene, 0.1 mol percent of oxygen, 10 mol percent carbon dioxide, 10 mol percent water and the balance argon. Different temperature levels were also used. The results are tabulated below in Table III.

TABLE III

| Experiment number | Temp., °F. | Mol percent ammonia decomposition using | | | | | |
|---|---|---|---|---|---|---|---|
| | | Ru | Rh | Os | Ir | Pt | Pd |
| 19 | 900 | 95 | 40 | 0 | 0 | 0 | 0 |
| 20 | 1,100 | 100 | 92 | 2 | 3 | 0 | 0 |
| 21 | 1,250 | 100 | 100 | 10 | 8 | 0 | 0 |

The above further shows that when the gaseous mixture additionally contains a hydrocarbon, oxygen and carbon dioxide, as in the exhaust gas from an internal combustion, ruthenium and rhodium are still effective in decomposing ammonia but that the activity of osmium, iridium, platinum and palladium is further reduced.

An additional series of experiments was carried out wherein a feed simulating a gaseous mixture obtained from an internal combustion engine consisting of 0.3 mol percent NO, 1.0 mol percent carbon monoxide, 0.5 mol percent hydrogen, 0.2 mol percent propylene, 0.1 mol percent oxygen, 10 mol percent carbon dioxide, 12 mol percent water and the balance argon was passed over a gamma alumina carrying 1.0 weight percent platinum and then over gamma alumina carrying 1.0 weight percent of ruthenium, rhodium, iridium, platinum or palladium. Each of these catalysts was prepared as in the experiments identified above. The gaseous mixture was passed over the catalyst in the first reactor at a GHSV of 20,000 (0.2 Troy ounce of catalyst per 1000 cubic feet of gaseous mixture per hour) and over the catalyst in the second reactor at a GHSV of 20,000 and 40,000 (0.2 and 0.1 Troy ounces, respectively, per 1000 cubic feet of gaseous mixture per hour). In the first reactor the temperature was maintained at 90° F., in the second at 1200° F. All of the NO was converted in the first reactor, with 88 mol percent selectivity to ammonia. The gaseous mixture leaving the first reactor and entering the second contained 0.26 mol percent ammonia. The decomposition of ammonia obtained in the second reactor is summarized below in Table IV.

TABLE IV

| Experiment number | Catalyst in second reaction zone | Decomposition at GHSV of— | |
|---|---|---|---|
| | | 20,000 | 40,000 |
| | | Mol percent ammonia | |
| 22 | Ru | 100 | 100 |
| 23 | Rh | 93 | 90 |
| 24 | Ir | 5 | 3 |
| 25 | Pt | 1 | 0 |
| 26 | Pd | 1 | 0 |

The advantages of using ruthenium or rhodium in decomposing ammonia in a gaseous mixture are further apparent from a study of Experiments Nos. 22 to 26. Since there is little or no ammonia in the effluent in the gaseous mixture in Experiments Nos. 22 and 23, such effluent can advantageously be treated in the presence of an oxidation catalyst under oxidizing conditions to convert carbon monoxide and hydrocarbons to carbon dioxide and water.

Although we have shown above a procedure for first reducing nitrogen oxides in the exhaust gas of an internal combustion engine to obtain a mixture containing ammonia and then passing the treated gaseous mixture to a second zone wherein the ammonia so formed is converted to nitrogen, it is within the scope of the teaching herein to use but one zone containing each of the required catalysts to effect the desired sequence of reactions defined herein, and the process defined herein is also intended to be so interpreted. For example, platinum and ruthenium can be placed in the same reactor wherein conditions necessary to effect each of the reactions defined herein are maintained. When the exhaust gas is then passed therethrough, the nitrogen oxides that come into contact with ruthenium will be converted to nitrogen as defined, for example, in our application Ser. No. 207,545, filed Dec. 13, 1971. The nitrogen oxides that come into contact with platinum, however, will, as defined herein, be converted not only to nitrogen but also ammonia. The ammonia so formed will come into contact with ruthenium and, as defined herein, will be converted to nitrogen.

This is exemplified by the following. An exhaust gas similar to that used in Example No. 22 was passed through a single catalytic bed containing equal volumes of a mechanical mixture of the following: 0.3 weight percent platinum on $\frac{1}{16}$-inch $Al_2O_3$ spheres and 0.3 weight percent ruthenium on $\frac{1}{16}$-inch $Al_2O_3$ spheres. The gas was passed over the catalyst at a GHSV of 40,000 and 1000° F. Under these conditions there was used 0.03 Troy ounce of platinum and 0.03 Troy ounce of ruthenium per 1000 cubic feet of gas per hour. The gas after passing over this catalyst mixture contained nitrogen as the only nitrogen-containing compound.

Although we have shown above one procedure for obtaining the catalyst mixture, it is understood that other procedures can also be used. For example, such a mixture can be prepared by thoroughly mixing powdered platinum, ruthenium and alumina or by coimpregnation of both metals on a support.

Although we have shown herein that effective results are obtained using solely catalysts effective in converting nitrogen oxides to ammonia and to nitrogen, it is within the scope of our invention to use other materials in combination therewith, for example, promoters, such as potassium, sodium, calcium, barium, magnesium, lithium, rubidium, cesium, strontium and thallium, etals such as cobalt, nickel, iron, manganese, rhenium, chromium, molybdenum, tellurium, tungsten, vanadium, niobium, antimony, tantalum, bismuth, titanium, zirconium, zinc, cadmium, copper and uranium, etc., provided the amounts of catalysts in the reducing zones are within the limits defined herein.

Resort may be had to such variations and modifications as fall within the spirit of the invention and the scope of the appended claims.

We claim:

1. A process for the reduction of substantially all of the nitrogen oxides in exhaust gas mixtures from internal combustion engines containing nitrogen oxides, free molecular oxygen, free molecular hydrogen, CO, hydrocarbons, $H_2O$, $CO_2$ and nitrogen to selectively form nitrogen as substantially the only nitrogen-containing compound which comprises contacting said exhaust gas at an elevated temperature under a reducing atmosphere with a first catalyst that converts at least a portion of said nitrogen oxides to a product comprising ammonia and then contacting the treated mixture at elevated temperatures under a reducing atmosphere with a second catalyst selected from the group consisting of ruthenium and rhodium to convert said ammonia to nitrogen.

2. The process of claim 1 wherein said first catalyst is platinum.

3. The process of claim 1 wherein said second catalyst is ruthenium.

4. The process of claim 1 wherein said second catalyst is rhodium.

5. The process of claim 1 wherein the amount of said catalysts is in the range of about 0.0001 to about 0.5 Troy ounce per 1000 cubic feet of exhaust gas per hour.

6. The process of claim 1 wherein the amount of said catalysts is in the range of about 0.3 to about 0.001 Troy ounce per 1000 cubic feet of exhaust gas per hour.

7. The process of claim 1 wherein contact with said first catalyst is in the range of about 600° to about 2000° F.

8. The process of claim 1 wherein contact with said first catalyst is in the range of about 800° to about 1500° F.

9. The process of claim 1 wherein contact with said second catalyst is in the range of about 800° to about 2000° F.

10. The process of claim 1 wherein said second catalyst is ruthenium and contact therewith is made in a temperature range of about 800° to about 2000° F.

11. The process of claim 1 wherein said second catalyst is ruthenium and contact therewith is made in a temperature range of about 900° to about 1400° F.

12. The process of claim 1 wherein said second catalyst is rhodium and contact therewith is made in a temperature range of about 1000° to about 2000° F.

13. The process of claim 1 wherein said second catalyst is rhodium and contact therewith is made in a temperature range of about 1100° to about 1500° F.

14. The process of claim 1 wherein the catalysts are on a support selected from the group consisting of alumina, silica, magnesia, thoria, titania, zirconia or mixtures thereof.

15. The process of claim 1 wherein the catalysts are on a support and the exhaust gas is passed through the reaction zones at a gas hourly space velocity of about 8,000 to about 200,000.

16. The process of claim 1 wherein the catalysts are on a support and the exhaust gas is passed through the reaction zones at a gas hourly space velocity of about 10,000 to about 90,000.

17. The process of claim 1 wherein the catalysts are on a support in an amount of about 0.05 to about 1.0 weight percent.

18. The process of claim 1 wherein the catalysts are on a support in an amount of about 0.05 to about 1.0 weight percent.

19. The process of claim 1 wherein the treated gases are further reacted in an oxidation reactor in the presence of an added gas containing free molecular oxygen to oxidize any hydrocarbons or carbon monoxide therein to a product comprising $CO_2$ and water.

20. The process of claim 19 wherein said oxidation is carried out in the presence of a Group VIII metal.

References Cited

UNITED STATES PATENTS

| | | | |
|---|---|---|---|
| 3,565,574 | 2/1971 | Kearby et al. | 423—213 |
| 2,601,221 | 6/1952 | Rosenblatt | 423—351 |

OTHER REFERENCES

Bernstein et al.: "Application of Catalysts to Auto $NO_x$ Emission Control," SAE Paper 710014, January 1971.

Mellor: *Comprehensive Treatise on Inorg. and Theoretical Chem.*, vol. VIII, Longmans, Green & Co., New York, 1928, pp. 394–7.

GEORGE O. PETERS, Primary Examiner

U.S. Cl. X.R.

55 DIG. 30; 60—301

PO-1050
(5/69)

UNITED STATES PATENT OFFICE
CERTIFICATE OF CORRECTION

Patent No. __3,825,654__  Dated __July 23, 1974__

Inventor(s) __Tadeusz P. Kobylinski and Brian W. Taylor__

It is certified that error appears in the above-identified patent and that said Letters Patent are hereby corrected as shown below:

Column 4, line 9, "0.0001" should be "0.001".

Column 7, line 2, "90° F." should be "900° F.".

Column 8, line 2 of claim 17, "0.05 to about 1.0" should read "0.01 to about 10".

Signed and sealed this 29th day of October 1974.

(SEAL)
Attest:

McCOY M. GIBSON JR.
Attesting Officer

C. MARSHALL DANN
Commissioner of Patents